March 7, 1944.                D. E. FIELDS                2,343,502

FOLLOWER RING FOR HEAT EXCHANGER DOME PLATES

Filed Oct. 12, 1942

David E. Fields
INVENTOR

BY Philip A. F. Turell
ATTORNEY

Patented Mar. 7, 1944

2,343,502

UNITED STATES PATENT OFFICE 2,343,502

FOLLOWER RING FOR HEAT EXCHANGER DOME PLATES

David E. Fields, Tulsa, Okla.

Application October 12, 1942, Serial No. 461,773

2 Claims. (Cl. 257—248)

The invention relates to a follower ring adapted to surround the periphery of a tube sheet and interposed between the split ring and dome plate flange, and to be expanded or contracted axially at various points entirely around the same to prevent distortion of the split ring and dome plate flange as the draw bolts, extending through the split ring and dome plate flange, are tightened against a gasket interposed between the dome plate flange and the tube sheet.

A further object is to form the follower from spaced rings having adjusting bolts between the rings and provided with right and left handed thread ends extending into the rings and forming means whereby the rings may be adjusted towards and away from each other.

A further object is to provide inwardly extending lugs carried by the follower ring and disposed between the draw bolts and into which the adjusting bolts are threaded thereby allowing the follower ring to extend around the circumferentially arranged draw bolts.

A further object is to provide one side of the split ring with a flange V-shaped in cross section and extending into a similar shaped channel in one side of the tube sheet for preventing spreading of the split ring as the draw bolts are tightened.

Figure 1:
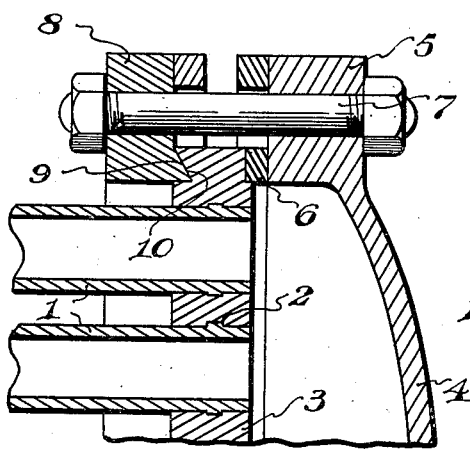
Figure 1 is a vertical longitudinal sectional view through one side of the dome head and tube sheet, showing the follower ring applied thereto.
Figure 2:
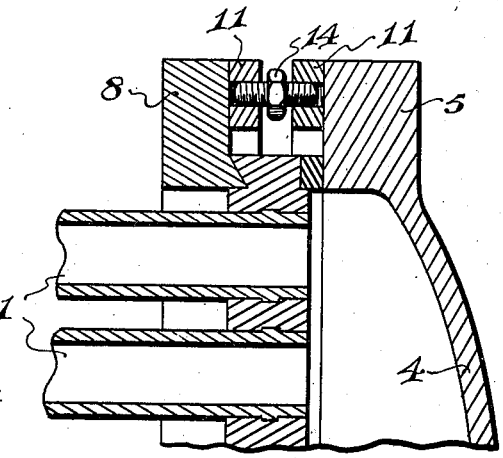
Figure 2 is a view similar to Figure 1, taken on the axis of one of the follower ring adjusting bolts.
Figure 3:
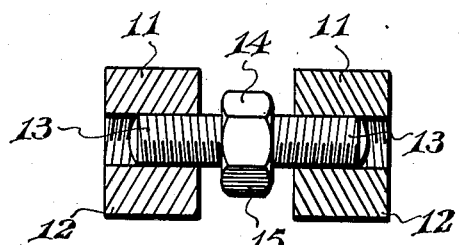
Figure 3 is a detail sectional view transversely through the follower ring.
Figure 5:
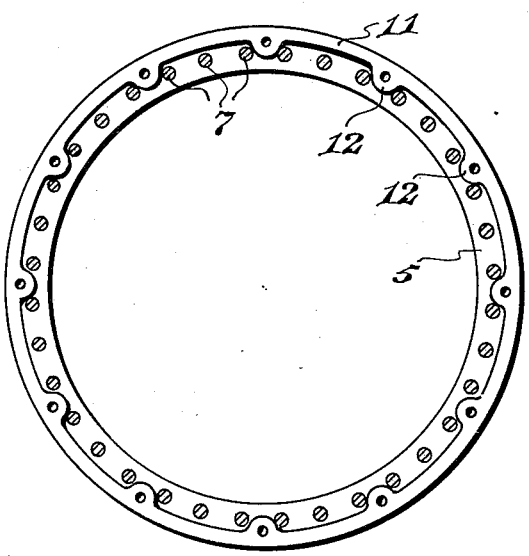
Figure 5 is a transverse sectional view, showing an inside view of the outer ring of the follower and the relation of the draw bolts to the ring lugs.
Figure 4:
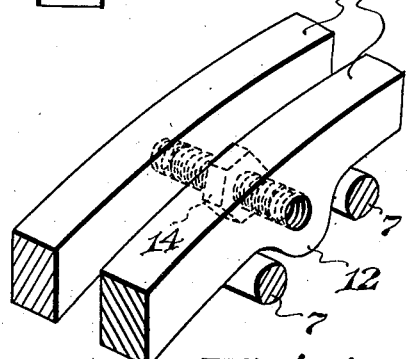
Figure 4 is a detail perspective view of a portion of the follower ring.

Referring to the drawing, the numeral 1 designates the tubes of a conventional form of heat exchanger, the ends of which are anchored at 2 in the tube sheet 3. Disposed to the outside of the tube sheet 3 is a dome plate 4 of conventional construction.

Interposed between the flange 5 of the dome plate 4 and the tube sheet 3 is a gasket 6 which is compressed when the draw bolts 7 are tightened, and unless the flange 5 is maintained substantially in a parallel plane to the plane of the tube sheet 3, during this tightening operation, not only the gasket is distorted and unevenly compressed, but often the dome flange 5 is distorted and a poor connection made. The draw bolts 7 extend across the tube sheet 3 and through a split ring 8, disposed on the inner side of the tube sheet and provided with a V-shaped flange 9 which extends into a channel 10 in the inner side of the tube sheet, and this channel is V-shaped so that when the draw bolts 7 are tightened the split ring will be maintained in position and will not spread. It has been found that the split ring is often distorted during the tightening operation, and the follower is specifically designed to allow the gradual drawing together of the dome flange 5 and the split ring uniformly in spaced relation as the bolts 7 are tightened.

The follower comprises spaced rings 11 of similar construction, and which rings surround the periphery of the tube sheet 3 to the outside of the draw bolts 7. The follower rings are placed in position after the ring 8 is positioned and before the dome plate 4 is positioned. Rings 11 are provided at spaced registering points with inwardly extending lugs 12, into which lugs are threaded the right and left hand threaded ends 13 of the adjusting bolts 14 which are interposed between the rings 11. It will be seen by applying a wrench to the bolt heads 15 the rings 11 may be adjusted inwardly or outwardly in relation to each other, and as the draw bolts 7 are tightened against the outer ring 11, the dome plate flange 5 will be prevented from excessive distortion, and at the same time the other ring 11 will bear against the split ring 8 and prevent distortion thereof. The same is true of the gasket 6, therefore it will be seen means is provided which will positively prevent distortion of parts, which often happens particularly with large exchangers where the mechanic can not observe all sides of the exchanger during the draw bolt tightening operation. With the present device he can easily adjust the follower rings for the proper compression and then the draw bolts can be tightened until the flange 5 of the dome plate is close against the same and this will limit further tightening of the draw bolts. The above operation may be an intermittent one if desired.

From the above it will be seen that a follower ring device is provided for heat exchanger dome plates, which follower ring is simple in construction, may be easily applied without varying the construction of the exchanger, and one which may be cheaply manufactured and sold.

The invention having been set forth what is claimed as new and useful is:

1. The combination with a heat exchanger tube sheet, a dome to one side of said sheet and of greater diameter than the tube sheet, a bolt receiving ring on the other side of the tube sheet and of greater diameter than the tube sheet, securing bolts extending through said ring and said dome spaced outwardly from the tube sheet, of a spacer device surrounding the tube sheet and interposed between the ring and dome for maintaining said ring and dome in substantial parallelism as the securing bolts are tightened, said spacer device comprising spaced rings one of said rings engaging the first mentioned ring, the other ring of the spacer device engaging the dome, bolts connecting the rings of the spacer device and having right and left handed threaded connection therewith.

2. A device as set forth in claim 1 including inwardly extending lugs carried by the spaced rings of the spacer device, said lugs extending inwardly between the securing bolts, said right and left handed bolts being threaded into said lugs.

DAVID E. FIELDS.